(12) United States Patent
Juan

(10) Patent No.: US 11,535,332 B2
(45) Date of Patent: Dec. 27, 2022

(54) ROTATION LOCKING DEVICE, SUSPENSION ASSEMBLY, AND VEHICLE

(71) Applicant: Gogoro Inc., Hong Kong (CN)

(72) Inventor: Ching Juan, New Taipei (TW)

(73) Assignee: Gogoro Inc., Hong Kong (CN)

( * ) Notice: Subject to any disclaimer, the term of this patent is extended or adjusted under 35 U.S.C. 154(b) by 672 days.

(21) Appl. No.: 16/505,427

(22) Filed: Jul. 8, 2019

(65) Prior Publication Data
US 2021/0009229 A1    Jan. 14, 2021

(51) Int. Cl.
*B62K 19/40* (2006.01)
*B62K 19/36* (2006.01)
*F16D 13/75* (2006.01)

(52) U.S. Cl.
CPC ............. *B62K 19/40* (2013.01); *B62K 19/36* (2013.01); *F16D 13/757* (2013.01)

(58) Field of Classification Search
CPC .......... B62K 19/36; B62K 5/10; B62K 25/04; B60G 2300/45; B60G 21/007; F16D 13/757
USPC ........................................................ 180/210
See application file for complete search history.

(56) References Cited

U.S. PATENT DOCUMENTS

| | | | | |
|---|---|---|---|---|
| 2,887,322 A | * | 5/1959 | De Monge | B60G 21/007 280/104 |
| 3,601,213 A | * | 8/1971 | Patin | B62K 5/10 D12/112 |
| 3,750,788 A | * | 8/1973 | Heinemann | F16D 13/64 188/71.3 |
| 4,826,194 A | | 5/1989 | Sakita | |
| 5,568,908 A | | 10/1996 | Kisiel | |
| 5,762,351 A | * | 6/1998 | SooHoo | B62K 5/10 280/282 |
| 7,815,220 B2 | * | 10/2010 | Demmon | B62D 1/184 280/774 |
| 8,459,679 B2 | * | 6/2013 | Jessie, Jr. | B62K 9/02 280/282 |
| 10,577,044 B1 | * | 3/2020 | Kejha | B60K 5/00 |
| 2010/0044977 A1 | * | 2/2010 | Hughes | B62K 5/10 280/5.509 |
| 2012/0308327 A1 | | 12/2012 | Goto | |

(Continued)

FOREIGN PATENT DOCUMENTS

| | | | |
|---|---|---|---|
| CN | 208133964 U | 11/2018 | |
| CN | 113840773 A | * 12/2021 | ............... B62H 5/06 |

(Continued)

OTHER PUBLICATIONS

European Office Action received for copending European Patent Application No. EP20163556.2; Applicant; Gogoro Inc.; dated Jun. 29, 2021, 6 pages.

(Continued)

*Primary Examiner* — Paul N Dickson
*Assistant Examiner* — Caitlin Anne Miller
(74) *Attorney, Agent, or Firm* — Perkins Coie LLP

(57) ABSTRACT

A rotation locking device includes a locking module and at least one engaging member. The at least one engaging member is rotatably coupled to the locking module. The locking module is configured to engaging and disengage the at least one engaging member, thereby refraining the at least one engaging member from rotating relative to the locking module.

33 Claims, 8 Drawing Sheets

(56) References Cited

U.S. PATENT DOCUMENTS

| | | | | |
|---|---|---|---|---|
| 2016/0137251 A1* | 5/2016 | Mercier | ................ | B60G 7/005 180/210 |
| 2017/0057585 A1* | 3/2017 | Mercier | ................ | B60G 5/043 |
| 2021/0031859 A1* | 2/2021 | Iwamoto | ................ | B60G 3/20 |

FOREIGN PATENT DOCUMENTS

| | | |
|---|---|---|
| EP | 3363594 A1 | 8/2018 |
| JP | S5948283 A | 3/1984 |
| JP | 2004324201 A | 11/2004 |
| TW | 200815231 A | 4/2008 |
| WO | 2014201463 A2 | 12/2014 |
| WO | 2018116211 A1 | 6/2018 |

OTHER PUBLICATIONS

European Search Report received for copending European Patent Application No. EP20163556.2; Applicant; Gogoro Inc.; dated Oct. 5, 2020, 6 pages.

Taiwanese Office Action issued for copending TW Application No. 110128789, Applicant: Gogoro Inc., dated Oct. 8, 2021, 6 pages.

* cited by examiner

ROTATION LOCKING DEVICE, SUSPENSION ASSEMBLY, AND VEHICLE

TECHNICAL FIELD

The present disclosure relates to a rotation locking device, a suspension assembly, and a vehicle.

BACKGROUND

The three-wheeler market kit/conversion industry is predominantly focused on vehicles having one front wheel and two rear wheels (1F2R), with a rapidly emerging focus on vehicles with two front wheels and one rear wheel (2F1R) for customs and production vehicle manufacturers. In comparison to a bicycle, as an inverted three-wheeled (i.e., 2F1R) vehicle has one more wheel to touch the ground, it offers better stability on slippery road surfaces, and can substantially reduce the possibility of sideslip and fall of the rider. In complex road environments, its driving safety is much better than a bicycle.

In a conventional three-wheeled vehicle, a linkage mechanism for connecting the two front wheels usually consists of two deformable trapeziums that permits the vehicle to lean while cornering, much like a motorcycle. However, such a conventional linkage mechanism lacks the means for locking the two front wheels at a certain angle, which can be rather inconvenient in many situations. For example, when such a conventional three-wheeled vehicle is parked in a parking space with level ground or when it is travelling at a low speed, it is preferred that the body of the vehicle is adjusted to the upright position (i.e., the handle of the vehicle should be kept horizontal); nevertheless, without the angle locking function, the vehicle will be left to tilt freely and is incapable of being kept at the upright position.

Accordingly, how to provide a rotation locking device to solve the aforementioned problems becomes an important issue to be solved by those in the industry.

SUMMARY

An aspect of the disclosure is to provide a rotation locking device that can efficiently solve the aforementioned problems.

According to an embodiment of the disclosure, a rotation locking device includes a locking module and at least one engaging member. The at least one engaging member is rotatably coupled to the locking module. The locking module is configured to engaging and disengage the at least one engaging member, thereby refraining the at least one engaging member from rotating relative to the locking module.

In an embodiment of the disclosure, the least one engaging member is coupled to a first base. The locking module includes a housing and a locking member. The housing is coupled to a second base. The second base is rotatably coupled to the first base. The locking member is slidably disposed in the housing and configured to engage and disengage the engaging member.

In an embodiment of the disclosure, the locking module and the at least one engaging member are rotatable around an axis.

In an embodiment of the disclosure, the locking module includes at least one locking member. The at least one engaging member and the at least one locking member each comprises a toothed portion. The toothed portion of the at least one locking member is configured to mesh with the toothed portion of the at least one engaging member.

In an embodiment of the disclosure, the at least one engaging member is coupled to one of a first base and a second base that are rotatably coupled to each other. The locking module further includes a housing pivotally coupled to the first base and the second base. The at least one locking member is slidably disposed in the housing.

In an embodiment of the disclosure, a number of teeth of the toothed portion of the at least one locking member is smaller than a number of teeth of the toothed portion of the at least one engaging member.

In an embodiment of the disclosure, teeth of each of the toothed portions of the at least one engaging members and the at least one locking member are radially extended.

In an embodiment of the disclosure, each tooth of at least one of the at least one engaging member and the at least one locking member has a top surface and two side surfaces respectively connected to opposite sides of the top surface. The top surface and one of the two side surfaces form an obtuse angle therebetween.

In an embodiment of the disclosure, the at least one locking member and the at least one engaging member are rotatable around an axis. The toothed portion of each of the at least one engaging member and the at least one locking member has teeth each extending toward the axis.

In an embodiment of the disclosure, a number of the at least one engaging member is two. The locking module is configured to engage and disengage the two engaging members.

In an embodiment of the disclosure, the at least one locking member includes a first locking member and a second locking member. The first locking member and the second locking member are positioned between the two engaging members.

In an embodiment of the disclosure, a number of the at least one engaging member is two. The locking module includes a housing, a first locking member, a second locking member, and a moving member. The first locking member is slidably disposed in the housing and configured to engage and disengage one of the two engaging members. The second locking member is slidably disposed in the housing and configured to engage and disengage another of the two engaging members. The moving member is slidably disposed in the housing and configured to move the first locking member and the second locking member.

In an embodiment of the disclosure, the moving member is configured to move between a first position and a second position relative to the housing. The moving member moves toward the first locking member and the second locking member while moving from the first position to the second position.

In an embodiment of the disclosure, the moving member is configured to push the first locking member and the second locking member to move toward each other while moving from the first position to the second position.

In an embodiment of the disclosure, the locking module further includes a resilient member located between and abutted against the first locking member and the second locking member.

According to another embodiment of the disclosure, a suspension assembly includes a suspension plate, a right arm assembly, a left arm assembly, a first engaging member, a second engaging member, and a locking module. The right arm assembly is pivotally coupled to the suspension plate. The left arm assembly is pivotally coupled to the suspension plate. The first engaging member is fixedly mounted on the right arm assembly. The second engaging member is fixedly mounted on the left arm assembly. The locking module is fixedly mounted on the suspension plate and configured to engage and disengage the first engaging member and the second engaging member.

In an embodiment of the disclosure, the right arm assembly and the left arm assembly are rotatable relative to the suspension plate around an axis.

In an embodiment of the disclosure, the locking module includes a first locking member and a second locking member. Each of the first engaging member, the second engaging member, the first locking member, and the second locking member includes a toothed portion. The toothed portions of the first locking member and the second locking member are configured to mesh with the toothed portions of the first engaging member and the second engaging member respectively.

In an embodiment of the disclosure, teeth of each of the toothed portions of the first engaging member, the second engaging member, the first locking member, and the second locking member radially extend.

In an embodiment of the disclosure, each tooth of at least one of the first engaging member, the second engaging member, the first locking member, and the second locking member has a top surface and two side surfaces respectively connected to opposite sides of the top surface. The top surface and one of the two side surfaces form an obtuse angle therebetween.

In an embodiment of the disclosure, a number of teeth of the toothed portion of the first locking member is smaller than a number of teeth of the toothed portion of the first engaging member. A number of teeth of the toothed portion of the second locking member is smaller than a number of teeth of the toothed portion of the second engaging member.

In an embodiment of the disclosure, the right arm assembly and the left arm assembly are rotatable relative to the suspension plate around an axis. The toothed portion of each of the first engaging member, the second engaging member, the first locking member, and the second locking member has teeth each extending toward the axis.

In an embodiment of the disclosure, the suspension plate has a through hole. The locking module is fixed to an inner wall of the through hole. The first engaging member and the second engaging member extend through the through hole.

In an embodiment of the disclosure, the locking module includes a housing, a first locking member, and a second locking member. The housing is fixed to the suspension plate. The first locking member is slidably disposed in the housing and configured to engage and disengage the first engaging member. The second locking member is slidably disposed in the housing and configured to engage and disengage the second engaging member.

In an embodiment of the disclosure, the first locking member and the second locking member are positioned between the first engaging member and the second engaging member.

In an embodiment of the disclosure, the housing has a first opening, a second opening, and an inner space connecting the first opening and the second opening. The first locking member and the second locking member are accommodated in the inner space and configured to respectively extrude from the first opening and the second opening.

In an embodiment of the disclosure, the locking module further includes a first seal ring and a second seal ring. The first seal ring is sleeved onto the first locking member and slidably abutted against an inner surface of the housing in an airtight manner. The second seal ring is sleeved onto the second locking member and slidably abutted against the inner surface in an airtight manner.

In an embodiment of the disclosure, the suspension assembly further includes a moving member slidably disposed in the housing. The moving member is configured to move the first locking member and the second locking member.

In an embodiment of the disclosure, the moving member is configured to move between a first position and a second position relative to the housing. The moving member moves toward the first locking member and the second locking member while moving from the first position to the second position.

In an embodiment of the disclosure, the moving member is configured to push the first locking member and the second locking member to move toward each other while moving from the first position to the second position.

In an embodiment of the disclosure, the locking module further includes a resilient member located between and abutted against the first locking member and the second locking member.

According to another embodiment of the disclosure, a vehicle includes the suspension assembly, a right front wheel, and a left front wheel. The suspension assembly further includes a right wheel holder and a left wheel holder. The right wheel holder is pivotally coupled to the right arm assembly and has a mounting shaft. The left wheel holder is pivotally coupled to the left arm assembly and has a mounting shaft. The right front wheel is pivotally coupled to the mounting shaft of the right wheel holder. The left front wheel is pivotally coupled to the mounting shaft of the left wheel holder.

In an embodiment of the disclosure, the locking module includes a housing and a moving member. The housing is fixed to the suspension plate. The moving member is slidably disposed in the housing and configured to move between a first position and a second position relative to the housing.

In an embodiment of the disclosure, the locking module further includes a switch fixed to the housing. The moving member triggers the switch while moving to a third position close to the first position and away from the second position.

In an embodiment of the disclosure, the locking module further includes a second switch fixed to the housing. The moving member triggers the second switch while moving to a fourth position close to the second position and away from the first position.

Accordingly, in the vehicle of the present disclosure, since the front suspension assembly is provided with the rotation locking function, the front wheels of the vehicle can be maintained at different tilt angles for various applications (e.g., at the upright position for parking or low speed traveling).

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
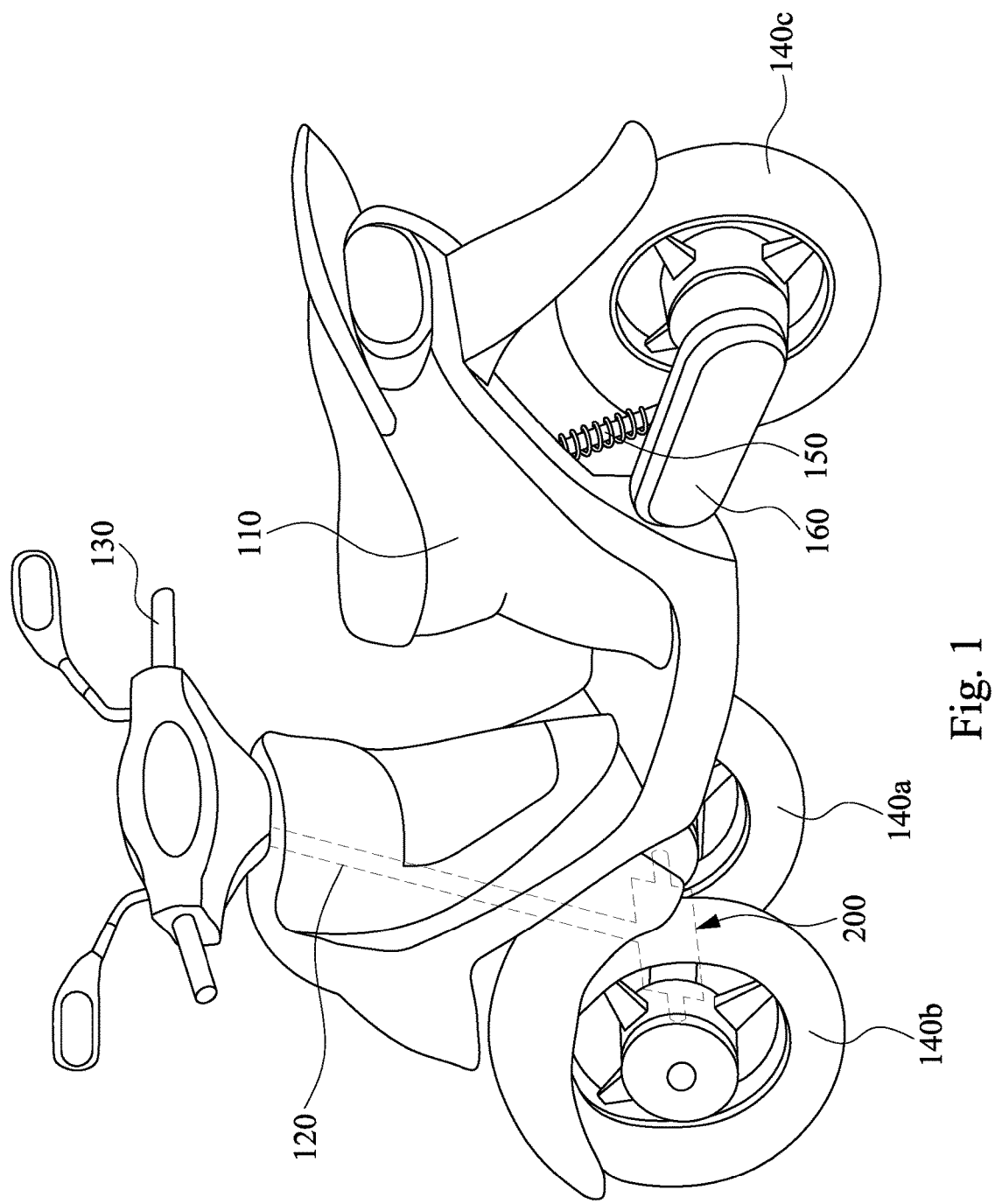
FIG. 1 is a perspective view of a vehicle according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

In the following description, if a component is coupled to another component, the use of the term "coupled" may imply that that there can be many ways to couple. For example, there can be an intermediary between the two components that couple. If a component is connected to another component, the use of the term "connected" may imply the two components are directly connected.

Reference is made to FIG. 1. FIG. 1 is a perspective view of a vehicle 100 according to some embodiments of the disclosure. As shown in FIG. 1, the vehicle 100 (e.g., a straddle-type vehicle) includes a body 110, a frame (not shown), a steering shaft 120, a handle 130, a right front wheel 140a, a left front wheel 140b, a rear wheel 140c, a front suspension assembly 200, a rear suspension assembly 150, a power module (not shown) and a transmission module 160. The frame is covered in the body 110. The steering shaft 120 passes through the body 110 and is pivotally coupled to the frame. The handle 130 is coupled to an upper end of the steering shaft 120 for a user to turn. The front suspension assembly 200 is coupled to and rotates together with the steering shaft 120. The right front wheel 140a and the left front wheel 140b are pivotally coupled to opposite sides of the front suspension assembly 200 respectively. As such, by steering the handle 130, the direction of travel of the vehicle 100 can be changed. The rear suspension assembly 150 is covered by the body 110 and coupled to the frame. The rear wheel 140c is pivotally coupled to the rear suspension assembly 150 and thus moves in a rocking manner relative to the frame. The power module and the transmission module 160 are coupled to the rear suspension assembly 150, and the power module is configured to rotate the rear wheel 140c through the transmission module 160. Therefore, the vehicle 100 is a so-called inverted three-wheeled vehicle (i.e., having two front wheels and one rear wheel).

Figure 2:
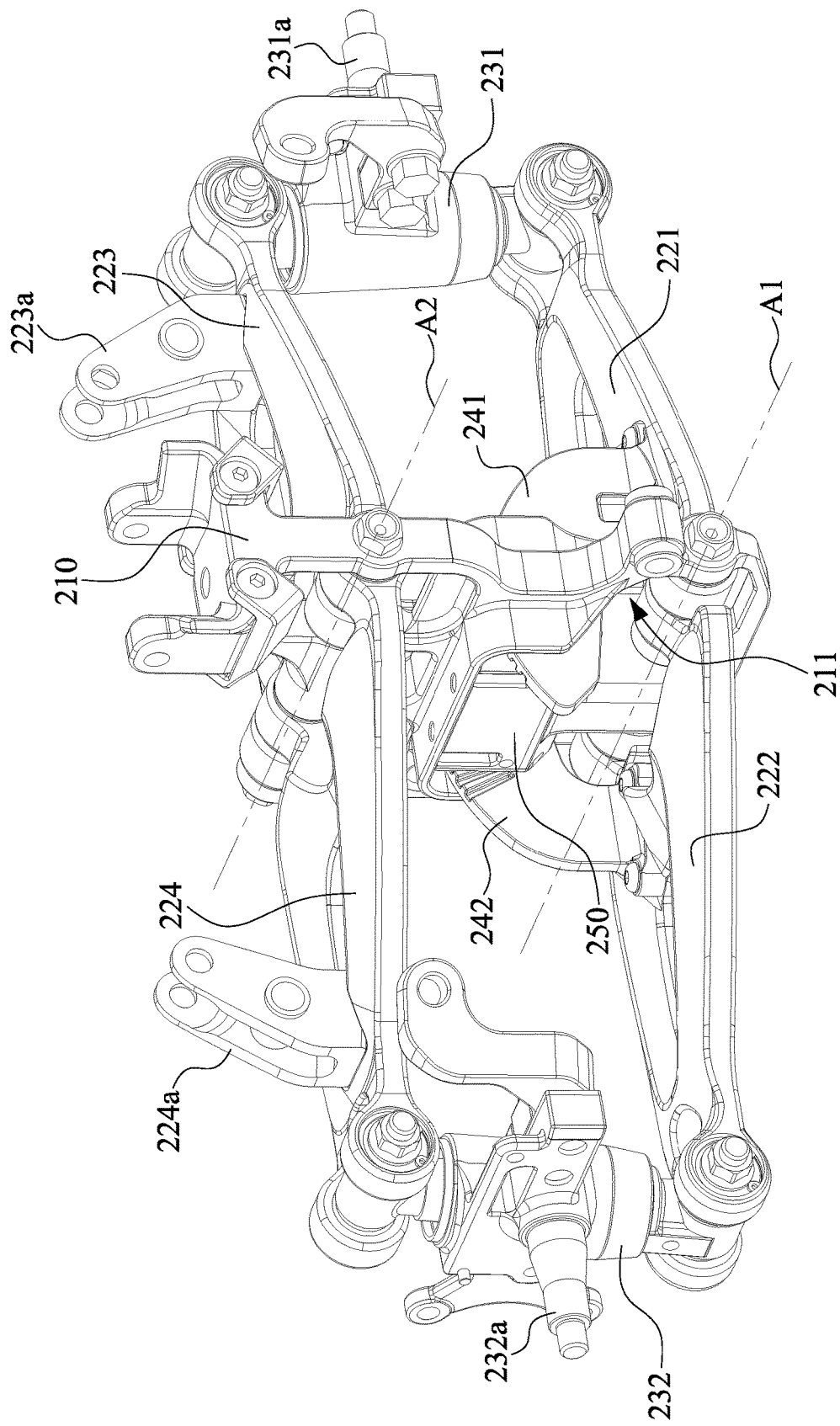
FIG. 2 is a perspective view of a front suspension assembly of the vehicle in FIG. 1 according to some embodiments of the disclosure.

Reference is made to FIG. 2. FIG. 2 is a perspective view of the front suspension assembly 200 of the vehicle in FIG. 1 according to some embodiments of the disclosure. As shown in FIG. 2, the front suspension assembly 200 includes a suspension plate 210, a right lower arm 221, a left lower arm 222, a right upper arm 223, a left upper arm 224, a right wheel holder 231, and a left wheel holder 232. The right lower arm 221 and the left lower arm 222 are pivotally coupled to the suspension plate 210 and rotatable relative to the suspension plate 210 around an axis A1. The right upper arm 223 and the left upper arm 224 are pivotally coupled to the suspension plate 210 and rotatable relative to the suspension plate 210 around another axis A2. The axis A1 and the axis A2 are parallel to each other. Two ends of the right wheel holder 231 are pivotally coupled to the right lower arm 221 and the right upper arm 223, respectively. As such, the suspension plate 210, the right lower arm 221, the right upper arm 223, and the right wheel holder 231 form a deformable trapezium. Two ends of the left wheel holder 232 are pivotally coupled to the left lower arm 222 and the left upper arm 224, respectively. As such, the suspension plate 210, the left lower arm 222, the left upper arm 224, and the left wheel holder 232 form another deformable trapezium. The right wheel holder 231 has a mounting shaft 231a, and the right front wheel 140a is pivotally coupled to the mounting shaft 231a of the right wheel holder 231. The left wheel holder 232 has a mounting shaft 232a, and the left front wheel 140b is pivotally coupled to the mounting shaft 232a of the left wheel holder 232.

In some embodiments, the right upper arm 223 has an extending portion 223a at a side of the right upper arm 223 away from the right lower arm 221, and the left upper arm 224 has an extending portion 224a at a side of the left upper arm 224 away from the left lower arm 222. The vehicle 100 further includes a damper (not shown), and two ends of the damper are respectively coupled to the extending portions 223a of the right upper arm 223 and the extending portion 224a of the left upper arm 224.

Figure 3:
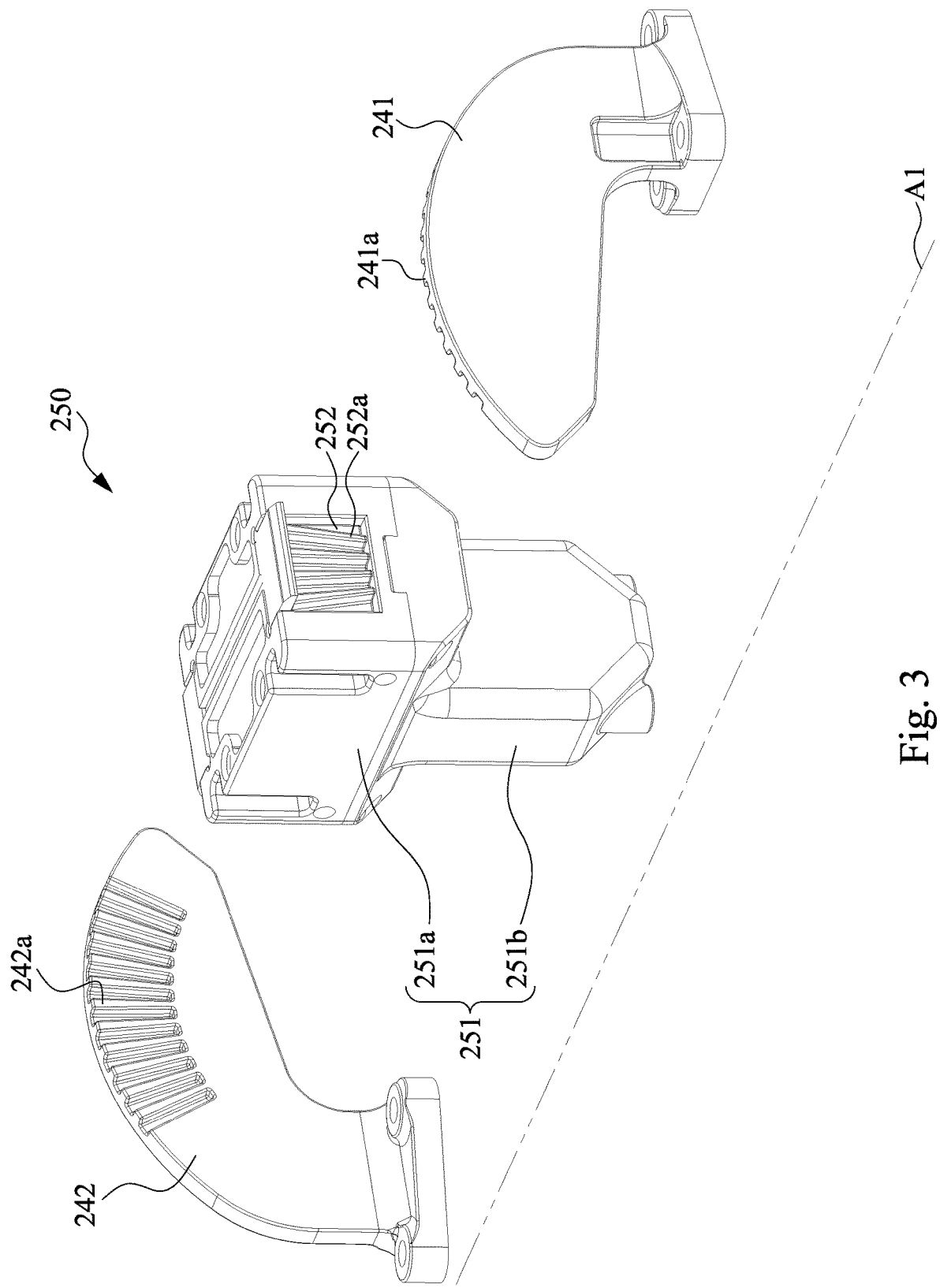
FIG. 3 is an exploded view of a first engaging member, a second engaging member, and a locking module of the front suspension assembly in FIG. 2 according to some embodiments of the disclosure.

Reference is made to FIG. 3. FIG. 3 is an exploded view of a first engaging member 241, a second engaging member 242, and a locking module 250 of the front suspension assembly 200 in FIG. 2 according to some embodiments of the disclosure. As shown in FIGS. 2 and 3, the front suspension assembly 200 further includes a first engaging member 241, a second engaging member 242, and a locking module 250. The first engaging member 241 is fixedly mounted on the right lower arm 221. The second engaging member 242 is fixedly mounted on the left lower arm 222. In some embodiments, the first engaging member 241 and the second engaging member 242 are fixedly mounted on the left lower arm 222 and the right lower arm 221, respectively. In practical applications, the first engaging member 241 can be fixedly mounted on one of the right upper arm 223 and the left upper arm 224, and the second engaging member 242 can be fixedly mounted on another of the right upper arm 223 and the left upper arm 224. The locking module 250 is fixedly mounted on the suspension plate 210 and configured to engage and disengage the first engaging member 241 and the second engaging member 242. Specifically, the first engaging member 241 is located between the right lower arm 221 and the right upper arm 223. The second engaging member 242 is located between the left lower arm 222 and the left upper arm 224. The suspension plate 210 has a through hole 211. The through hole 211 is between the axis A1 and the axis A2. The locking module 250 is fixedly mounted on an inner wall of the through hole 211. The first engaging member 241 and the second engaging member 242 are configured to extend through the through hole 211. With the foregoing structural configurations, the components of the front suspension assembly 200 may be arranged in a compact fashion with a small footprint.

In some embodiments, the locking module 250 includes two locking members configured to engage and disengage the first engaging member 241 and the second engaging member 242, respectively. In some alternative embodiments, the locking module 250 only includes one locking member configured to engage and disengage the first engaging member 241 and the second engaging member 242 at the same time. Correspondingly, the first engaging member 241 and the second engaging member 242 may extend to the same side of the locking module 250.

Figure 4:
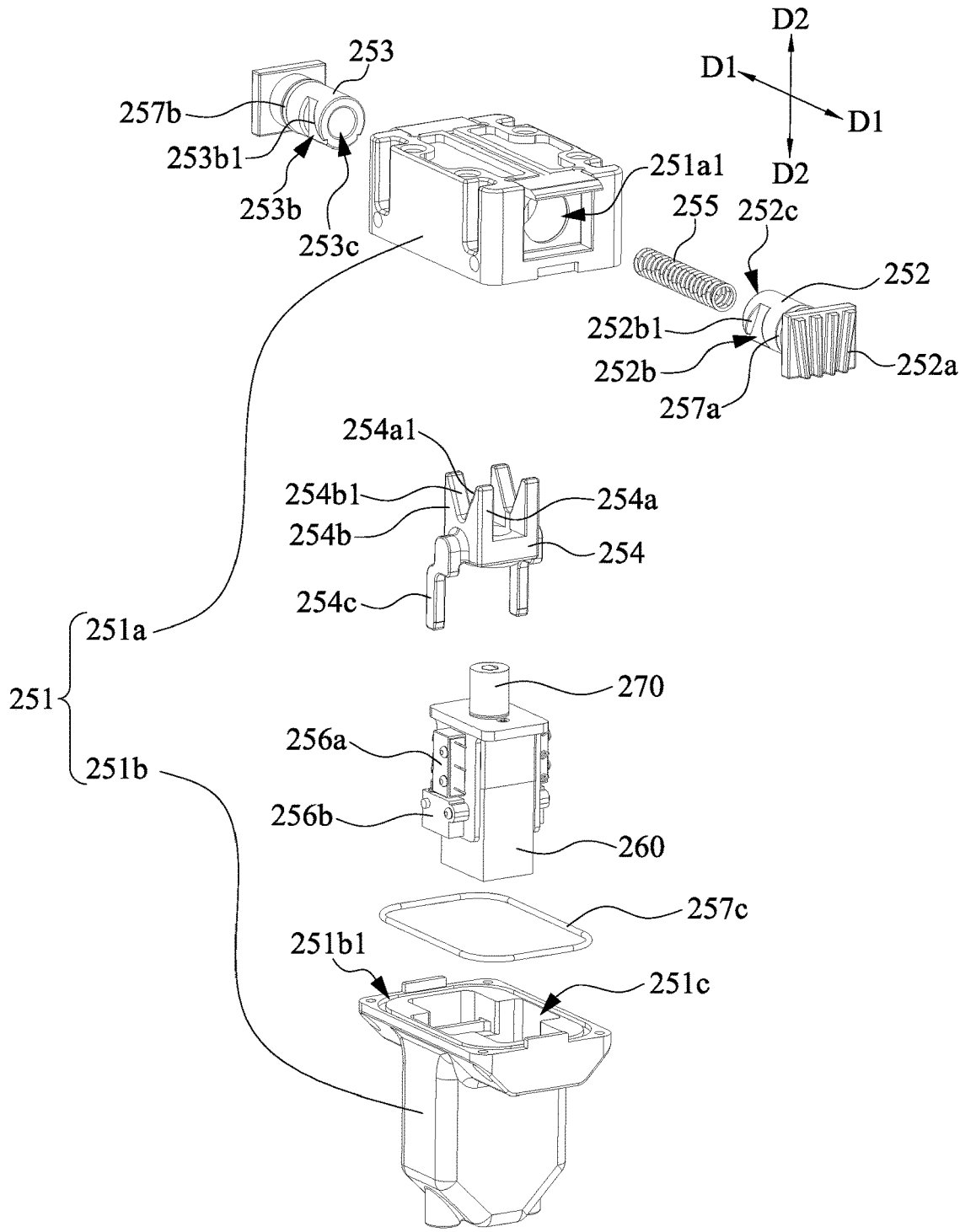
FIG. 4 is an exploded view of the locking module in FIG. 3 according to some embodiments of the disclosure.

Reference is made to FIG. 4. FIG. 4 is an exploded view of the locking module 250 in FIG. 3 according to some embodiments of the disclosure. As shown in FIGS. 3 and 4, the locking module 250 includes a housing 251, a first locking member 252, and a second locking member 253. The housing 251 is fixedly mounted on the suspension plate 210 at the inner wall of the through hole 211. The first locking member 252 is slidably coupled to the housing 251 and configured to engage and disengage the first engaging member 241. The second locking member 253 is slidably coupled to the housing 251 and configured to engage and disengage the second engaging member 242. The first locking member 252 and the second locking member 253 are between the first engaging member 241 and the second engaging member 242. With the foregoing structural configurations, the front suspension assembly 200 is provided with the rotation locking function, which is capable of maintaining the front wheels 140a, 140b of the vehicle 100 at a certain angle.

The rotation locking function of the linkage mechanism enables various applications of the vehicle 100. In some embodiments, when the vehicle 100 is travelling at a low speed, the tilt angle of the body 110 can be maintained at the upright position. With the foregoing configuration, the driver can easily steer the vehicle 100 with one hand without having to maintain the vehicle at a certain tilt angle with both hands. In such a way, the driver would have a free hand to perform other tasks. This angle locking function particularly advantageous when the vehicle 100 is travelling at a low speed, for example, when the vehicle is being used for goods transportation goods, mail delivery or when the vehicle is being driven on construction sites. In some embodiments, when the vehicle 100 is parked in a parking space with a level ground, the body 110 of the vehicle 100 can be maintained at the upright position by locking the front wheels 140a, 140b at the normal angle. In some embodiments, when the vehicle 100 is parked on a slope, the body 110 of the vehicle 100 can be maintained at a tilt angle such that one of the front wheels 140a, 140b is abutted against the curb next to the slope.

Figure 5A:
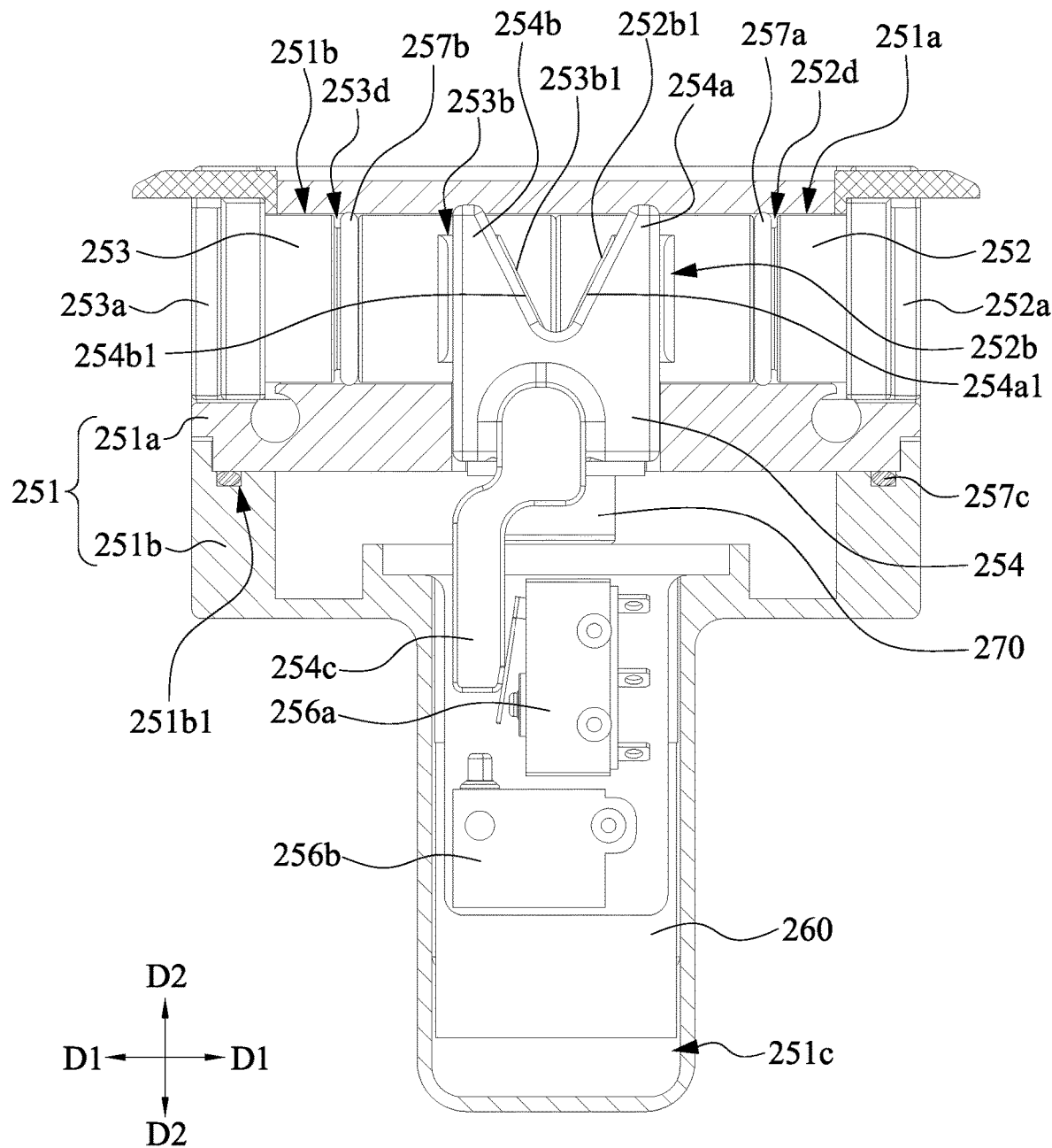
FIG. 5A is a front view of the locking module in FIG. 3, in which the housing and a third seal ring are shown in cross-section.
Figure 5B:
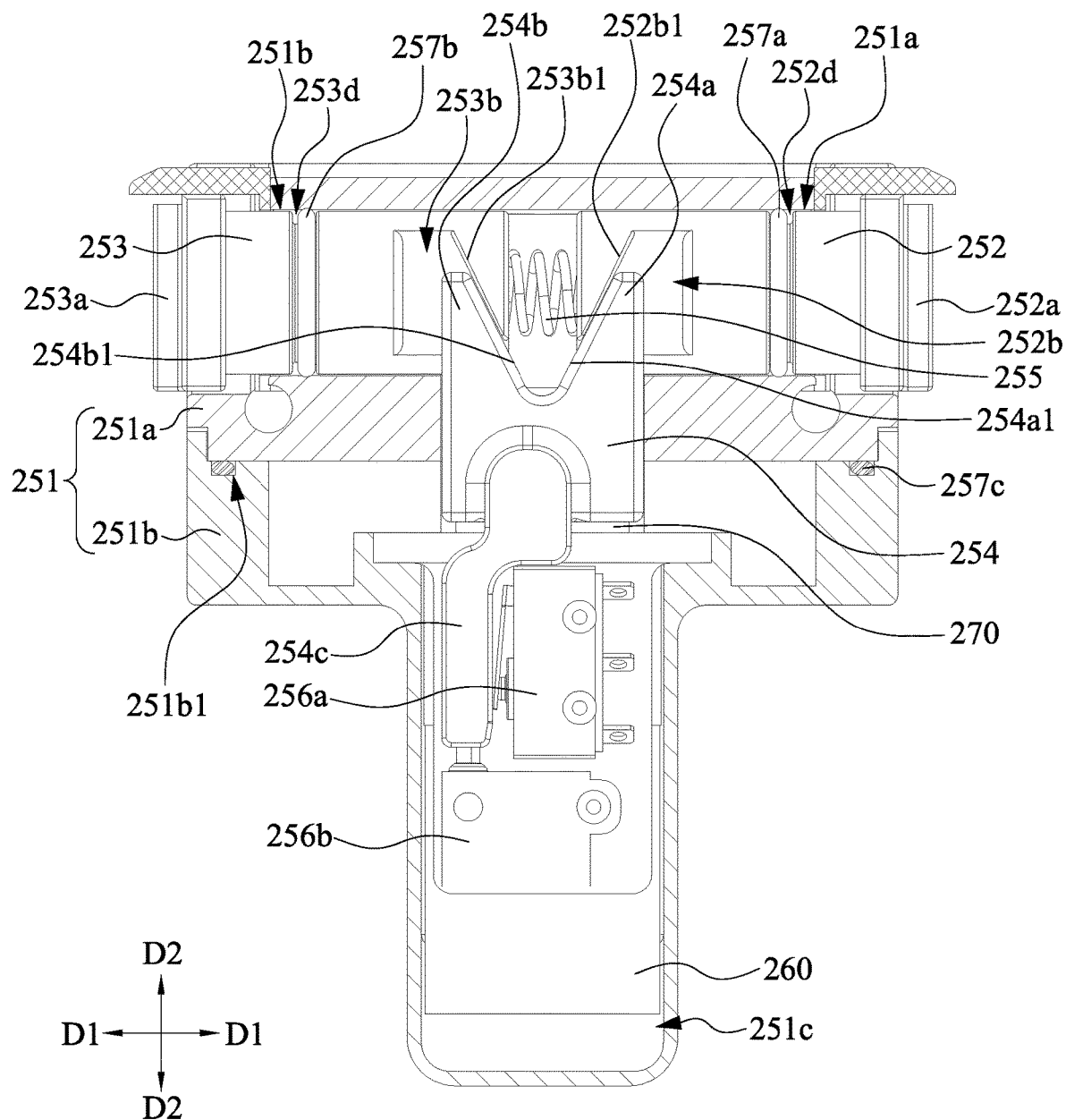
FIG. 5B is another front view of the locking module in FIG. 5A.

Reference is made to FIGS. 5A and 5B. FIG. 5A is a front view of the locking module 250 in FIG. 3, in which the housing 251 and a third seal ring 257c are shown in cross-section. FIG. 5B is another front view of the locking module 250 in FIG. 5A. As shown in FIGS. 3 to 5B, the first engaging member 241 includes a toothed portion 241a, the second engaging member 242 includes a toothed portion 242a, the first locking member 252 includes a toothed portion 252a, and the second locking member 253 includes a toothed portion 253a. The toothed portion 252a of the first locking member 252 and the toothed portion 253a the second locking member 253 are configured to mesh with the toothed portion 241a of the first engaging member 241 and the toothed portion 242a the second engaging member 242 respectively.

In some embodiments, a number of teeth of the toothed portion 252a of the first locking member 252 is smaller than a number of teeth of the toothed portion 241a of the first engaging member 241, and the toothed portion 252a of the first locking member 252 and the toothed portion 241a of the first engaging member 241 have the same tooth pitch. A number of teeth of the toothed portion 253a of the second locking member 253 is smaller than a number of teeth of the toothed portion 242a of the second engaging member 242, and the toothed portion 253a of the second locking member 253 and the toothed portion 242a of the second engaging member 242 have the same tooth pitch. For example, as shown in FIG. 3, the toothed portion 252a of the first locking member 252 has four teeth, and the toothed portion 241a of the first engaging member 241 has eleven teeth, but the disclosure is not limited in this regard.

In addition, as shown in FIG. 3, the teeth of each of the toothed portions 241a, 242a, 252a, 253a of the first engaging member 241, the second engaging member 242, the first locking member 252, and the second locking member 253 are radially extended. It should be noted that the extension referred to herein refers to the extension of the height direction of the teeth. For example, the teeth of each of the toothed portions 241a, 242a, 252a, 253a are extended toward the axis A1. As such, the toothed portion 252a of the first locking member 252 can selectively mesh with a certain part of the toothed portion 241a by rotating the first engaging member 241 about the axis A1, and the toothed portion 253a of the second locking member 253 can also selectively mesh with a certain part of the toothed portion 242a by rotating the second engaging member 242 about the axis A1.

In some embodiments, each tooth of the toothed portions 241a, 242a, 252a, 253a has a top contacting surface and two side contacting surfaces respectively connected to opposite edges of the top contacting surface. An angle between the top contacting surface and each of the side contacting surfaces is configured to be in a range from about 97 to 100 degrees (i.e., an obtuse angle), but the disclosure is not limited in this regard. The design of the foregoing angle may effectively increase the ease of engagement and difficulty of separation between the toothed portions 241a, 252a of the first engaging member 241 and the first locking member 252 and between the second engaging member 242 and the second locking member 253.

As shown in FIGS. 4 to 5B, the housing 251 of the locking module 250 has a first part 251a and a second part 251b detachably coupled to the first part 251a. The first part 251a has a first opening 251a1 and a second opening 251a2 respectively at opposite sides of the first part 251a. An inner space 251c is formed in the housing 251 between the first part 251a and the second part 251b. The first locking member 252 and the second locking member 253 are accommodated in the inner space 251c and respectively exposed from the first opening 251a1 and the second opening 251a2.

In some embodiments, as shown in FIGS. 5A and 5B, the first locking member 252 and the second locking member 253 are movable in a first direction D1 relative to the housing 251, but the disclosure is not limited in this regard. The locking module 250 further includes a moving member 254. The moving member 254 is slidably disposed in the housing 251 and configured to move the first locking member 252 and the second locking member 253. In some embodiments, as shown in FIGS. 5A and 5B, the moving member 254 is movable in a second direction D2 relative to the housing 251, but the disclosure is not limited in this regard. In some embodiments, the first direction D1 is substantially perpendicular to the second direction D2, but the disclosure is not limited in this regard.

In some embodiments, as shown in FIGS. 5A and 5B, the moving member 254 pushes the first locking member 252 and the second locking member 253 to move toward each other while moving toward the first locking member 252 and the second locking member 253 (i.e., as changing from FIG. 5B to FIG. 5A), thereby disengaging the first locking member 252 and the second locking member 253 from the first engaging member 241 and the second engaging member 242, respectively. As such, the right lower arm 221 and the left lower arm 222 are free to rotate relative to the suspension plate 210 about the axis A1.

Specifically, as shown in FIGS. 4 to 5B, the first locking member 252 has a notch 252b substantially facing the moving member 254. The notch 252b has an inclined surface 252b1 at a side of the notch 252b adjacent to the second locking member 253. The second locking member 253 has a notch 253b substantially facing the moving member 254. The notch 253b has an inclined surface 253b1 at a side of the notch 253b adjacent to the first locking member 252. The moving member 254 includes a first pushing portion 254a and a second pushing portion 254b. The first pushing portion 254a has a pushing surface 254a1 configured to push the inclined surfaces 252b1. The second pushing portion 254b has a pushing surface 254b1 configured to push the inclined surfaces 253b1. As such, when the moving member 254 moves toward the first locking member 252 and the second locking member 253 along the second direction D2 (i.e., as changing from FIG. 5B to FIG. 5A), the first pushing portion 254a and the second pushing portion 254b respectively insert into the notches 252b, 253b and the pushing surfaces 254a1, 254b1 respectively push the inclined surfaces 252b1, 253b1, thereby moving the first locking member 252 and the second locking member 253 toward each other.

In some embodiment, as shown in FIGS. 4 to 5B, the pushing surfaces 254a1, 254b1 are connected to each other as a V shape, but the disclosure is not limited in this regard.

In some embodiments, as shown in FIGS. 4 and 5B, the locking module 250 further includes a resilient member 255. The resilient member 255 is located between and abuts against the first locking member 252 and the second locking member 253. When the moving member 254 moves away from the first locking member 252 and the second locking member 253 (i.e., as changing from FIG. 5A to FIG. 5B), the resilient member 255 pushes the first locking member 252 and the second locking member 253 to move away from each other, thereby engaging the first locking member 252 and the second locking member 253 to the first engaging member 241 and the second engaging member 242, respectively. As such, the right lower arm 221 and the left lower arm 222 are locked and are prevented from rotating relative to each other. In some embodiments, the resilient member 255 is a compression spring, but the disclosure is not limited in this regard.

In some alternative embodiments, the moving member 254 is modified to push the first locking member 252 and the second locking member 253 to move away from each other while moving toward the first locking member 252 and the second locking member 253, so as to engage the first locking member 252 and the second locking member 253 with the first engaging member 241 and the second engaging member 242, respectively. Correspondingly, the resilient member 255 is modified to pull the first locking member 252 and the second locking member 253 to move toward each other, so as to disengage the first locking member 252 and the second locking member 253 from the first engaging member 241 and the second engaging member 242, respectively. For example, the resilient member 255 is a tension spring, but the disclosure is not limited in this regard.

In some embodiments, as shown in FIG. 4, the first locking member 252 further has a recess 252c facing the second locking member 253. The second locking member 253 further includes a recess 253c facing the first locking member 252. The resilient member 255 is partially accommodated in the recesses 252c, 253c, so as to be positioned between the first locking member 252 and the second locking member 253.

In some embodiments, as shown in FIGS. 4 to 5B, the locking module 250 further includes an actuating member 260 and a screw 270. The actuating member 260 is fixedly mounted on the housing 251 and accommodated in the inner space 251c. The actuating member 260 is a motor configured to rotate the screw 270. The screw 270 is screwed with the moving member 254. The moving member 254 is retained by an inner surface 251d of the housing 251 so that the moving member 254 is slidable in the second direction D2 relative to the housing without rotating. As such, the actuating member 260 is further configured to move the moving member 254 along the direction D2 by rotating the screw 270.

In some embodiments, the locking module 250 is waterproof. Specifically, as shown in FIGS. 4 to 5B, the locking module 250 further includes a first seal ring 257a, a second seal ring 257b, and a third seal ring 257c. The first locking member 252 has a groove 252d. The second locking member 253 has a groove 253d. The second part 251b has a groove 251b1. The first seal ring 257a is sleeved onto the first locking member 252, accommodated in the groove 252d, and slidably abuts against the inner surface 251d of the housing 251 in an airtight manner. The second seal ring 257b is sleeved onto the second locking member 253, accommodated in the groove 253d, and slidably abuts against the inner surface 251d in an airtight manner. The third seal ring 257c is accommodated in the groove 251b1 and abuts against the first part 251a and the second part 251b of the housing 251 in an airtight manner.

Figure 6:
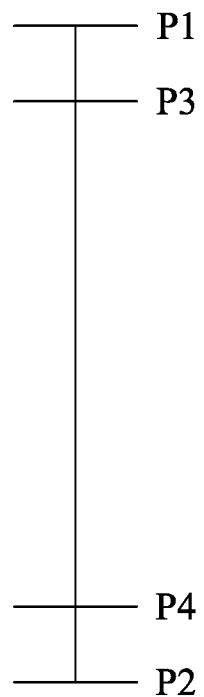
FIG. 6 is a schematic diagram illustrating the position of a moving member relative to the housing.

Reference is made to FIG. 6. FIG. 6 is a schematic diagram illustrating the position of the moving member 254 relative to the housing 251. As shown in FIGS. 5A to 6, the moving member 254 is configured to move between a first position P1 (corresponding to the position of the moving member 254 in FIG. 5A) and a second position P2 (corresponding to the position of the moving member 254 in FIG. 5B) relative to the housing 251. The locking module 250 further includes a switch 256a, which is fixed to the housing 251 and is mounted to the actuating member 260. The moving member 254 further includes a third pushing portion 254c. The third pushing portion 254c triggers the switch 256a when the moving member 254 is moved to a third position P3 that is close to the first position P1 and away from the second position P2. In practical application, when the moving member 254 triggers the switch 256a at the third position P3, the speed of the vehicle 100 may be limited to a safety range to cope with possible dangerous situations in which the first locking member 252 is still engaged with the first engaging member 241 and/or the second locking member 253 is still engaged with the second engaging member 242.

In some embodiments, as shown in FIGS. 5A and 6, the locking module 250 further includes another switch 256b, which is fixed to the housing 251 and is mounted to the actuating member 260. The third pushing portion 254c triggers said another switch 256b when the moving member 254 is moved to a fourth position P4 that close to the second position P2 and away from the first position P1. That is, the fourth position P4 is between the second position P2 and the third position P3. In practical application, when the moving member 254 is moved within a range between the second position P2 and the fourth position P4 and both the switch 256a and the switch 256b are triggered, the vehicle 100 may be prevented from starting up. When the moving member 254 is moved from a position within the range between the second position P2 and the fourth position P4 to a position within a range between the third position P3 and the fourth position P4 such that the switch 256b is not triggered, the vehicle 100 may be allowed to start up but the speed of the vehicle 100 may be limited as discussed above.

In addition, during the disengagement process in which the moving member 254 is expected to move from the second position P2 to the first position P1, an alert indicating that the disengagement process is incomplete may be sent to the user if at least the switch 256a is still triggered. During the engagement process in which the moving member 254 is expected to move from the first position P1 to the second position P2, an alert indicating that the engagement process is incomplete may be sent to the user if none of the switches 256a, 256b or only the switch 256a is triggered.

Figure 7:
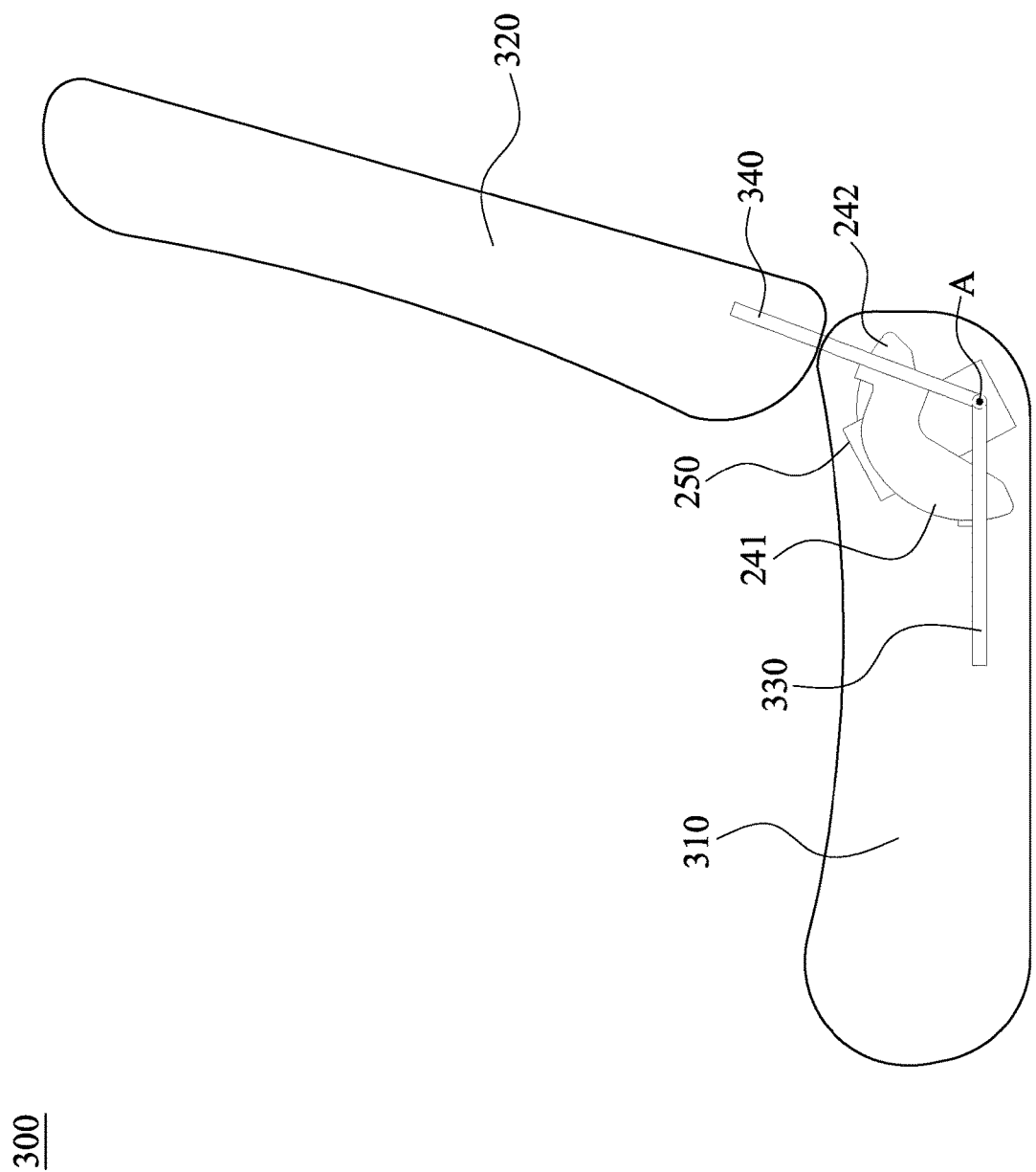
FIG. 7 is a side view of a seat according to some embodiments of the disclosure.

In practical applications, the rotation locking device of the present disclosure may also be applied to other devices. Reference is made to FIG. 7. FIG. 7 is a side view of a seat 300 according to some embodiments of the disclosure. As show in FIG. 7, the seat 300 includes a seat cushion 310, a seat back 320, and a rotation locking device. The seat cushion 310 and the seat back 320 are rotatably coupled to each other through the rotation locking device. In addition to the first engaging member 241, the second engaging member 242, and the locking module 250 as described in above embodiments, the rotation locking device further includes a first base 330 and a second base 340. The first base 330 is mounted to the seat cushion 310. The second base 340 is mounted to the seat back 320. The second base 340 is pivotally coupled to the first base 330. The first engaging member 241 is disposed on and coupled to the first base 330. The second engaging member 242 is disposed on and coupled to the second base 340. The locking module 250, the first base, and the second base are rotatable around an axis A. For example, the locking module 250 is pivotally coupled to the first base 330 and the second base 340 while being configured to engage and disengage the first engaging member 241 and the second engaging member 242. As such, when the locking module 250 disengage the first engaging member 241 and the second engaging member 242, the seat back 320 can rotate freely and rapidly relative to the seat cushion 310 so as to adjust an angle included between the seat back 320 and the seat cushion 310; in addition, when the locking module 250 engages the first engaging member 241 and the second engaging member 242, the angle between the seat back 320 and the seat cushion 310 can be fixed.

In some embodiment, one of the first engaging member 241 and the second engaging member 242 may be omitted, and the locking module 250 may be fixedly mounted on one of the first base 330 and the second base 340 on which said one of the first engaging member 241 and the second engaging member 242 is originally disposed.

According to the foregoing recitations of the embodiments of the disclosure, it can be seen that in the vehicle of the present disclosure, since the front suspension assembly is provided with the rotation locking function, the body of the vehicle can be maintained at different tilt angles for various applications (e.g., at the upright position when parking).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A rotation locking device, comprising:
 a locking module; and
 at least one engaging member rotatably coupled to the locking module,
 wherein the locking module is configured to engage and disengage the at least one engaging member, thereby refraining the at least one engaging member from rotating relative to the locking module,
 wherein the at least one locking member comprises a first locking member and a second locking member, wherein the at least one engaging member includes two engaging members, and wherein the first locking member and the second locking member are positioned between the two engaging members.

2. The rotation locking device of claim 1, wherein the least one engaging member is coupled to a first base, and the locking module comprises:
 a housing coupled to a second base, wherein the second base is rotatably coupled to the first base; and
 a locking member slidably disposed in the housing and configured to engage and disengage the engaging member.

3. The rotation locking device of claim 1, wherein the locking module and the at least one engaging member are rotatable around an axis.

4. The rotation locking device of claim 1, wherein the locking module comprises at least one locking member, the at least one engaging member and the at least one locking member each comprises a toothed portion, and the toothed portion of the at least one locking member is configured to mesh with the toothed portion of the at least one engaging member.

5. The rotation locking device of claim 4, wherein the at least one engaging member is coupled to one of a first base and a second base that are rotatably coupled to each other, the locking module further comprises a housing pivotally coupled to the first base and the second base, and the at least one locking member is slidably disposed in the housing.

6. The rotation locking device of claim 4, wherein a number of teeth of the toothed portion of the at least one locking member is smaller than a number of teeth of the toothed portion of the at least one engaging member.

7. The rotation locking device of claim 4, wherein teeth of each of the toothed portions of the at least one engaging members and the at least one locking member are radially extended.

8. The rotation locking device of claim 4, wherein each tooth of at least one of the at least one engaging member and the at least one locking member has a top surface and two side surfaces respectively connected to opposite sides of the top surface, and the top surface and one of the two side surfaces form an obtuse angle therebetween.

9. The rotation locking device of claim 4, wherein the at least one locking member and the at least one engaging member are rotatable around an axis, and the toothed portion of each of the at least one engaging member and the at least one locking member has teeth each extending toward the axis.

10. The rotation locking device of claim 4, wherein the locking module is configured to engage and disengage the two engaging members.

11. The rotation locking device of claim 1, wherein the locking module comprises:
   a housing;
   a first locking member slidably disposed in the housing and configured to engage and disengage one of the two engaging members;
   a second locking member slidably disposed in the housing and configured to engage and disengage another of the two engaging members; and
   a moving member slidably disposed in the housing and configured to move the first locking member and the second locking member.

12. The rotation locking device of claim 11, wherein the moving member is configured to move between a first position and a second position relative to the housing, and the moving member moves toward the first locking member and the second locking member while moving from the first position to the second position.

13. The rotation locking device of claim 12, wherein the moving member is configured to push the first locking member and the second locking member to move toward each other while moving from the first position to the second position.

14. The rotation locking device of claim 13, wherein the locking module further comprises a resilient member located between and abutted against the first locking member and the second locking member.

15. A suspension assembly, comprising:
   a suspension plate;
   a right arm assembly pivotally coupled to the suspension plate;
   a left arm assembly pivotally coupled to the suspension plate;
   a first engaging member fixedly mounted on the right arm assembly;
   a second engaging member fixedly mounted on the left arm assembly; and
   a locking module fixedly mounted on the suspension plate and configured to engage and disengage the first engaging member and the second engaging member,
   wherein the suspension plate has a through hole, the locking module is fixed to an inner wall of the through hole, and the first engaging member and the second engaging member extend through the through hole.

16. The suspension assembly of claim 15, wherein the right arm assembly and the left arm assembly are rotatable relative to the suspension plate around an axis.

17. The suspension assembly of claim 15, wherein the locking module comprises a first locking member and a second locking member, each of the first engaging member, the second engaging member, the first locking member, and the second locking member comprises a toothed portion, and the toothed portions of the first locking member and the second locking member are configured to mesh with the toothed portions of the first engaging member and the second engaging member respectively.

18. The suspension assembly of claim 17, wherein teeth of each of the toothed portions of the first engaging member, the second engaging member, the first locking member, and the second locking member radially extend.

19. The suspension assembly of claim 17, wherein each tooth of at least one of the first engaging member, the second engaging member, the first locking member, and the second locking member has a top surface and two side surfaces respectively connected to opposite sides of the top surface, and the top surface and one of the two side surfaces form an obtuse angle therebetween.

20. The suspension assembly of claim 17, wherein a number of teeth of the toothed portion of the first locking member is smaller than a number of teeth of the toothed portion of the first engaging member, and a number of teeth of the toothed portion of the second locking member is smaller than a number of teeth of the toothed portion of the second engaging member.

21. The suspension assembly of claim 17, wherein the right arm assembly and the left arm assembly are rotatable relative to the suspension plate around an axis, and the toothed portion of each of the first engaging member, the second engaging member, the first locking member, and the second locking member has teeth each extending toward the axis.

22. The suspension assembly of claim 15, wherein the locking module comprises:
   a housing fixed to the suspension plate;
   a first locking member slidably disposed in the housing and configured to engage and disengage the first engaging member; and
   a second locking member slidably disposed in the housing and configured to engage and disengage the second engaging member.

23. The suspension assembly of claim 22, wherein the first locking member and the second locking member are positioned between the first engaging member and the second engaging member.

24. The suspension assembly of claim 22, wherein the housing has a first opening, a second opening, and an inner space connecting the first opening and the second opening, and the first locking member and the second locking member are accommodated in the inner space and configured to respectively extrude from the first opening and the second opening.

25. The suspension assembly of claim 24, wherein the locking module further comprises:
   a first seal ring sleeved onto the first locking member and slidably abutted against an inner surface of the housing in an airtight manner; and
   a second seal ring sleeved onto the second locking member and slidably abutted against the inner surface in an airtight manner.

26. The suspension assembly of claim 22, further comprising a moving member slidably disposed in the housing, wherein the moving member is configured to move the first locking member and the second locking member.

27. The suspension assembly of claim 26, wherein the moving member is configured to move between a first position and a second position relative to the housing, and the moving member moves toward the first locking member and the second locking member while moving from the first position to the second position.

28. The suspension assembly of claim 27, wherein the moving member is configured to push the first locking member and the second locking member to move toward each other while moving from the first position to the second position.

29. The suspension assembly of claim 28, wherein the locking module further comprises a resilient member located between and abutted against the first locking member and the second locking member.

30. A vehicle, comprising:
the suspension assembly of any of claim 15 further comprising:
a right wheel holder pivotally coupled to the right arm assembly and having a mounting shaft; and
a left wheel holder pivotally coupled to the left arm assembly and having a mounting shaft;
a right front wheel pivotally coupled to the mounting shaft of the right wheel holder; and
a left front wheel pivotally coupled to the mounting shaft of the left wheel holder.

31. The vehicle of claim 30, wherein the locking module comprises:
a housing fixed to the suspension plate; and
a moving member slidably disposed in the housing and configured to move between a first position and a second position relative to the housing.

32. The vehicle of claim 31, wherein the locking module further comprises a switch fixed to the housing, and the moving member triggers the switch while moving to a third position close to the first position and away from the second position.

33. The vehicle of claim 32, wherein the locking module further comprises a second switch fixed to the housing, and the moving member triggers the second switch while moving to a fourth position close to the second position and away from the first position.

* * * * *